Nov. 10, 1931. T. LAURENT 1,831,744
METHOD AND APPARATUS FOR MEASURING THE AMPLIFICATION
RATIO OF ELECTRIC AMPLIFIERS
Filed March 30, 1929

Patented Nov. 10, 1931

1,831,744

UNITED STATES PATENT OFFICE

TORBERN LAURENT, OF STOCKHOLM, SWEDEN, ASSIGNOR TO TELEFONAKTIEBOLAGET L. M. ERICSSON, OF STOCKHOLM, SWEDEN, A COMPANY OF SWEDEN

METHOD AND APPARATUS FOR MEASURING THE AMPLIFICATION RATIO OF ELECTRIC AMPLIFIERS

Application filed March 30, 1929, Serial No. 351,318, and in Sweden March 28, 1928.

Application filed in Sweden March 28, 1928.

The present invention relates to a method and an apparatus for determining or measuring the amplification ratio of electric amplifiers. The invention has for its object to simplify such measurements as far as possible and to provide an apparatus of simple and reliable construction for the purpose specified. More particularly, the invention has for its object to make it possible to perform such measurements without using auxiliary voltages, oscillators or other expensive apparatus whereby amplification measurements may be an economic possibility also in repeater circuits of the most simple kind. According to the invention the output side of the amplifier is connected to the input side thereof over a net-work or the like the damping of which is so adjusted as to cause the amplifier to produce self-oscillations, in which case the amplification is at least of such a value as to cover the damping of the oscillating system. If the damping is so adjusted that the condition of self-oscillations just starts the value of the damping of the net-work may be used as a measure of the amplification ratio.

Figure 1:
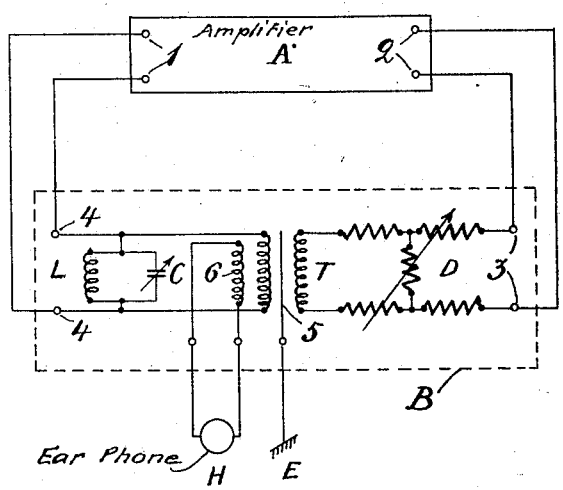
Figure 2:
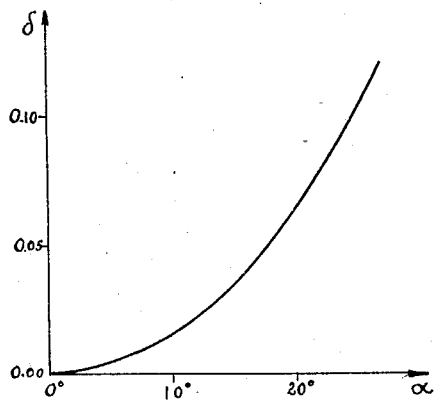

The invention will be more closely described with reference to the accompanying drawings in which Figure 1 is a circuit diagram showing a measuring apparatus according to an embodiment of the invention connected to an electric amplifier. Figure 2 shows a diagram.

Referring to Fig. 1, A is the electric amplifier, the output terminals 2 of which are back-coupled by means of the measuring apparatus shown inside the dashed lines B to the input terminals 1. The output terminals 4 of the measuring apparatus are connected to the input terminals 1 of the amplifier and the output terminals 2 of the amplifier to the input terminals 3 of the measuring apparatus.

According to the shown embodiment the measuring apparatus contains next to the input terminals 3 an adjustable distortionless artificial damping device D which by way of example may be composed of resistances combined in H-shape as shown in Figure 1 or in any other suitable manner. The output terminals of the artificial damping device are connected to the primary winding of a transformer T provided with three windings. The primary and secondary windings are disposed symmetrically in relation to an intermediate shield 5 which is earthed at E. A telephone receiver H is connected to the third winding 6. Between the terminals of the secondary winding of the transformer which are directly connected to the output terminals 4 of the measuring apparatus a resonance shunt is inserted which shunt comprises an inductance L and a variable condenser C connected in parallel thereto.

The apparatus may be used in the following manner: The resonance shunt L, C is tuned to the frequency at which the amplification ratio is desired to be measured. The damping of the adjustable artificial damping device D is varied to the point of silence i. e. to the limit of setting the amplifier into self-oscillations which limit may be observed in the telephone receiver H. The amplifier will then as a rule oscillate at said resonance frequency. If the resonance impedance of the resonance shunt is sufficiently high in comparison with the characteristic impedance of the artificial damping D and the input impedance of the amplifier, the additional damping in the measuring apparatus introduced by the transformer T the self-inductance L and the capacity C is negligible. Provided the phase displacement in the amplifier i. e. the phase angle between the output and the input voltages lies within certain limits the absolute value of the amplification is practically equal to the absolute value of the damping.

Figure 2 shows the difference $\delta$ between the real and the measured amplification as a function of the phase displacement $\alpha$ of the amplifier. This difference may be expressed through the formula $$\delta = {}^e\log \frac{1}{\cos \alpha}.$$

As may be seen from said formula comparatively great phase displacements may be allowed before said difference is of any practical importance.

When measuring the amplification ratio in amplifiers in which filters are included considerable phase displacements may occur. The phase displacement, however, varies considerably with the frequency and generally, as a consequence, there are nearly always frequencies at which the phase displacement is insignificant and the present measuring apparatus may then be used. Said frequencies are characterized by that the measured amplification has a maximum equal to the real amplification at those frequencies. Guided by this fact, said frequencies may thus be found. Experience has further shown that the resonance shunt L, C at frequencies near to the natural frequency of the resonance shunt L, C has a phase distorting effect of such a character that it automatically compensates the phase displacement in the amplifier. Consequently the difference between real and measured amplification becomes substantially less than the above mentioned theoretical value. As, further, the damping of the resonance shunt is constant at the said frequencies, the measured result will be easy to correct for said damping, if required.

The shown arrangement of the transformer T has for its object to shield off unsymmetric currents and voltages which may occur under certain conditions, for instance if the branches of the back-coupling net-work are not symmetrically arranged, and which would produce an oscillating state substantially independent of the resonance shunt. The shield 5 then forms a kind of short circuit for occasional charging currents which otherwise would pass across the intermediate space between the transformer windings. The transformer may, however, especially in a completely symmetric arrangement, be replaced by other arrangements or in certain cases omitted altogether.

The measuring apparatus may in certain cases be simplified, by way of example, if it is a question of amplification measurements in an amplifier in which the amplification is adjustable by means of for instance a potentiometer. No variable parts are then necessary in the measuring apparatus. Such a simplified measuring apparatus may also be used in case it is desired to ascertain that the amplification ratio of the amplifier reaches a certain minimum value.

Instead of disposing the oscillatory circuit L, C as a shunt between the two branches of the back coupling device as in the shown embodiment, self-inductances and capacities may be connected into circuit in the branches proper in such a manner that they can be tuned to a certain desired frequency. However, it is then more difficult to establish the desired symmetry in the back-coupling device. Different kinds of filters may also be used instead of the oscillatory circuit but such filters are as a rule unnecessarily complicated and they introduce also a damping which is not negligible. On the other hand such damping means need not necessarily introduce any error in the measuring result if only the value of the damping of the filter is known.

The measuring apparatus may also be used for damping measurements. For this purpose the net-work or the like, the damping of which is to be measured, is included into the circuit comprising the back coupling device and an amplifier of known amplification ratio higher than the absolute value of the damping. The damping to be measured may be determined on the basis of the known amplification ratio and the value of the known damping of the back-coupling device at the position of silence.

In addition to the above mentioned advantages of the measuring apparatus i. e. its simplicity and cheapness, the absence of delicate parts and the fact that no auxiliary voltages or auxiliary current sources are required when applying the apparatus, it may be mentioned that measurements with the apparatus are very easy to perform and that the measuring result is free from subjective measuring errors.

As the point at which the damping is just balanced by the amplification is determined by the starting of self-oscillations erroneous measurements on account of overloading the amplifier never need to be feared.

I claim:—

1. A method for determining the amplification ratio of an electric amplifier which consists in connecting the output side of an amplifier to the input side thereof over a back-coupling, choosing the damping of the system formed so as to be equal to a predetermined value corresponding to a certain average amplification ratio, and ascertaining by means of a suitable indicator whether the system is in a state of self-oscillation in which case the amplification is at least of such a value as to cover the damping of the oscillating system.

2. A method for determining the amplification ratio of an electric amplifier which consists in connecting the output side of an amplifier to the input side thereof over a back-coupling, varying the damping of the system formed so as to cause the amplifier to produce self-oscillations, and determining the value of the damping for which the condition of self-oscillations starts.

3. An apparatus for determining the amplification ratio of an electric amplifier comprising in combination a network with damping properties and an indicator connected with said network for detecting oscillations therein, said network being adapted to serve as a back-coupling between the output side and the input side of the amplifier.

4. An apparatus for measuring the amplification ratio of an electric amplifier, comprising in combination a network, means for varying the value of the damping of said network and an indicator connected with said network for detecting oscillations therein, said network being adapted to serve as a back-coupling between the output side and the input side of the amplifier.

5. An apparatus for determining the amplification ratio of an electric amplifier comprising in combination a network, a tunable oscillatory circuit connected therewith, an indicator connected with the network for detecting oscillations therein, said network being adapted to serve as a back-coupling between the output side and the input side of the amplifier.

6. An apparatus as claimed in claim 5, characterized by that the oscillatory circuit consists of an inductance shunted between the branches of the network and a condenser connected in parallel with said inductance.

In testimony whereof I affix my signature.

TORBERN LAURENT.